United States Patent [19]

DeSadier

[11] 4,155,787

[45] May 22, 1979

[54] METHOD FOR THE APPLICATION OF CELLULAR GLASS BLOCKS TO SPHERICAL VESSELS

[75] Inventor: Eddie L. DeSadier, Metairie, La.

[73] Assignee: Environmental Control Specialists, Incorporated, Kenner, La.

[21] Appl. No.: 857,712

[22] Filed: Dec. 5, 1977

[51] Int. Cl.[2] .......................... E04B 2/00; C09J 3/30; H05B 27/06

[52] U.S. Cl. ....................................... 156/71; 52/249; 52/747; 156/331; 156/337; 220/453; 220/901

[58] Field of Search ......................... 156/71, 331, 337; 52/747, 249, 80; 220/453, 901

[56] References Cited

U.S. PATENT DOCUMENTS 3,372,083 3/1968 Evans et al. ......................... 156/337

*Primary Examiner*—Douglas J. Drummond

*Attorney, Agent, or Firm*—George R. Douglas, Jr.; Anthony D. Cennamo

[57] ABSTRACT

This invention relates to a method for applying preformed cellular glass insulation blocks to the exterior surface of a spherical metallic storage vessel by the steps of:

(a) cleaning the exterior surface of the vessel;

(b) maintaining the vessel at a temperature of 80–100° F.;

(c)

(1) beveling the side walls of a preformed cellular glass insulation block, (2) dishing the inner surface of the preformed block to correspond to the contour of the spherical vessel to which the block is to be adhered, (3) applying uncatalyzed urethane-modified asphalt adhesive stored at 35°-50° F. just prior to use to the thus dished inner surface and beveled edges of the cellular glass block to completely fill the dished surface, (4) spraying the thus-applied urethane-modified asphalt adhesive with a curing agent, and (5) pressing the block against the surface of the vessel whereby adhesive oozes from between the block and the surface of the vessel; and (d) repeating steps of (c) with successive blocks, each of which is butted firmly against adjacent previously-applied blocks, until the entire surface of the vessel is covered.

7 Claims, 7 Drawing Figures

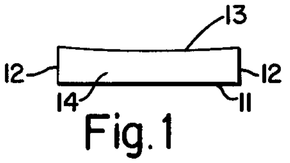
Fig.1
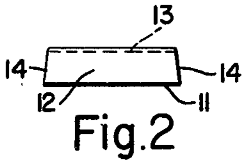
Fig.2
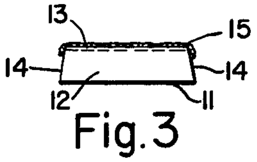
Fig.3
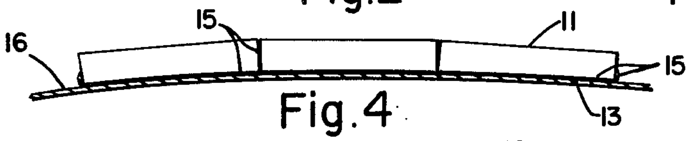
Fig.4
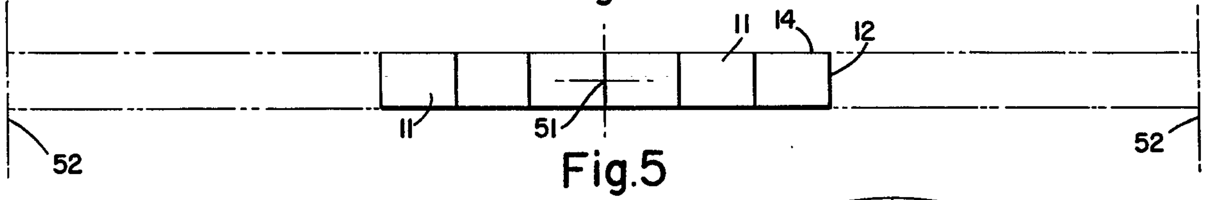
Fig.5
Fig.6
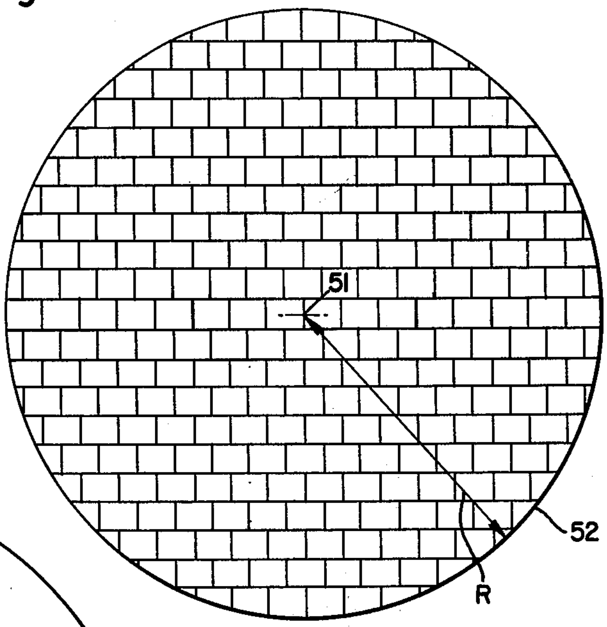
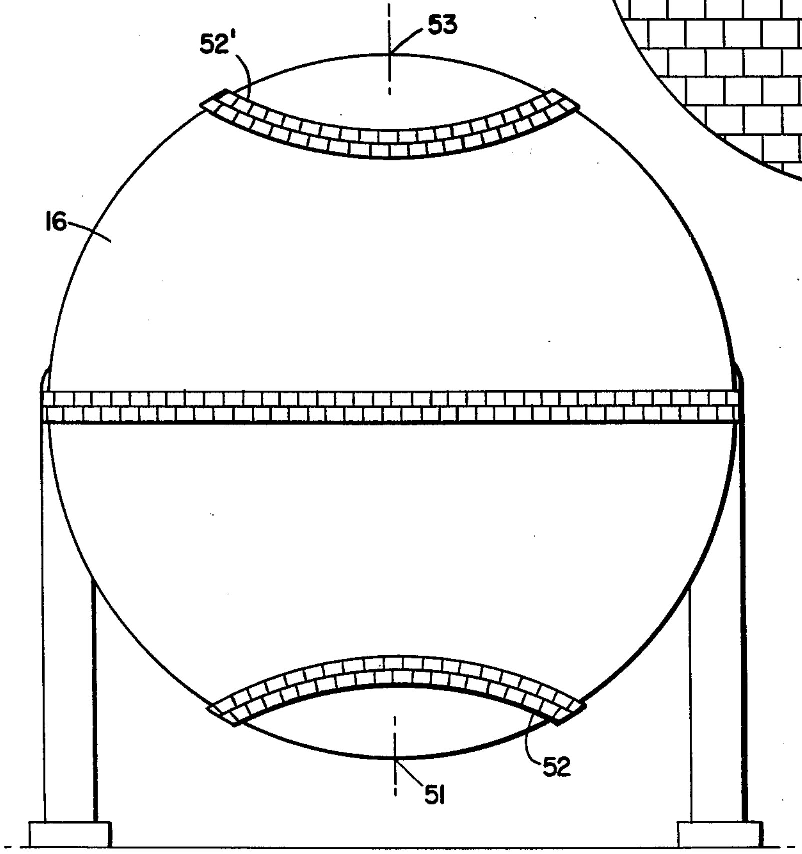
Fig.7

METHOD FOR THE APPLICATION OF CELLULAR GLASS BLOCKS TO SPHERICAL VESSELS

BACKGROUND OF THE INVENTION

This invention relates to a method for the application of cellular glass blocks to the outer surface of a spherical metal vessel, e.g., a storage tank for liquid ammonia or liquified natural gas.

Vessels of this type are generally expected to operate at temperatures from −50° F. to +50° F., with occasional high temperature cycles up to about 120° F. Insulation is required so that the temperature and pressure within the vessel remains relatively constant. In the case of vessels intended for operation in the lower temperature ranges, properly applied insulation is recommended to prevent condensation and/or frost build-up under ambient conditions of high temperature and high humidity, e.g., 85° F., 80% relative humidity.

In one conventional technique for applying cellular glass insulation blocks to spherical metal objects, the metal surface is cleaned and primed with an asphalt primer. Glass blocks are shaped to fit snugly to the shell and adjacent glass blocks and the surface of the blocks coated with the selected adhesive and the butt edges thereof coated with joint vapor sealant. The blocks are laid so that, when the blocks are pressed together, a complete vapor seal is formed with adjacent blocks.

In another conventional technique, the metal surface is blasted to gray metal and primed with an inorganic zinc primer. The glass insulation blocks are cut to fit the shell and adjacent insulation snugly and coated with urethanated asphalt premixed with catalyst and with vapor joint sealer at the butt edges.

In either case, when there is a surface irregularity, e.g., a weld joint, which causes a block to rock, the insulation block is scored to provide for good contact with the metal surface, to prevent breakage of the block and to eliminate voids which can lead to frost build-up.

The blocks are conventionally laid as follows:

1. The equator course is laid first and then seven or eight horizontal courses above the equator.
2. The next courses are applied vertically from points 90° apart on the equator in such a manner that the courses meet over the top of the sphere.
3. There remain four pie-shaped sections in which blocks have to be cut to fit during application.
4. Starting at the bottom of the sphere, three to four courses of blocks are applied around the bottom pole.
5. The next courses are applied vertically from points 90° apart running upward to the equator line.
6. There remain four pie-shaped sections in which blocks have to be cut to fit during application.

It will be obvious that there is substantial waste of glass insulation material, which must be cut to fit into the resulting 8 pie-shaped segments.

Generally, a tacky weather barrier mastic is applied over the insulation blocks. Small voids are first sealed with a sealing compound and larger voids with light weight fiberglass. Over the mastic is applied reinforcing cloth, which is overcoated with mastic to penetrate the cloth and achieve a good bond with the first coat of mastic.

Conventional procedures for the application of cellular glass blocks to metallic spheres may also require horizontal banding of the completed article with one to three aluminum or steel retaining bands.

Deficiencies of the existing methods include the requirement for different kinds of adhesives for the faces of the foam insulation blocks and the butt edges thereof, the effort required in applying aluminum retaining bands, difficulties in handling pre-catalyzed urethanated asphalt adhesives, and failure of the resulting adhesive bond after unacceptably short periods of time, with the resulting need to refurbish the insulation coating or to apply additional sealant to prevent condensation or frost accumulation.

It is an object of this invention to provide a method for applying blocks of cellular glass insulation to spherical metallic storage tanks in which (1) the same material is used as adhesive and joint sealant,
(2) the pot life of the adhesive is controllable,
(3) the resulting insulation-coated sphere is more durable and resistant to premature failure than heretofore,
(4) waste of insulating material is very low, and
(5) retaining bands are not required.

SUMMARY OF THE INVENTION

In one aspect, this invention relates to a method for the application of preformed cellular glass insulation blocks to the exterior surface of a spherical metallic storage vessel comprising the steps of:

(a) cleaning the exterior surface of the vessel;
(b) maintaining the vessel at a temperature of 80°-100° F.;
(c)
  (1) beveling the side walls of a preformed cellular glass insulation block,
  (2) dishing the inner surface of the preformed block to correspond to the contour of the spherical vessel to which the block is to be adhered,
  (3) applying uncatalyzed urethane-modified asphalt adhesive stored at 35°-50° F. just prior to use to the thus dished inner surface and beveled edges of the cellular glass block to completely fill the dished surface,
  (4) spraying the thus-applied urethane-modified asphalt adhesive with a curing agent, and
  (5) pressing the block against the surface of the vessel whereby adhesive oozes from between the block and the surface of the vessel; and
(d) repeating steps of (c) with successive blocks, each of which is butted firmly against adjacent previously-applied blocks, until the entire surface of the vessel is covered.

In another aspect, this invention relates, in a method for the application of preformed fitted cellular glass insulation blocks to the clean surface of a spherical metallic storage vessel with an adhesive, to the improvement comprising:

(a) laying a first course of blocks with the long axis of each block parallel to the ground beginning at the top or bottom of the spherical vessel and extending from the top or bottom for a preselected distance of 20-30% of the radius of the sphere of the vessel;
(b) laying a plurality of subsequent courses on either side of the first course, with the long axis of each block parallel to the ground, until an area of the sphere is covered corresponding to that circumscribed by the preselected distance of 20-30% of the radius of the sphere;
(c) scribing a first circular line on the surface of the blocks laid in step (b), the line having a radius of the preselected distance of 20–30% of the radius of the sphere;

(d) sawing through the blocks on the first circular line scribed in step (c) at right angles to the surface of the sphere;

(e) laying subsequent courses of blocks with the long edges thereof parallel to the ground until a course is laid within the preselected distance of step (a) of the radius of the sphere from the extremity of the sphere opposite to that covered in step (a);

(f) scribing a second circular line on the surface of the blocks laid in step (e), the second circular line having the same radius as the first circular line and originating at the extremity opposite to that covered in step (a);

(g) sawing through the blocks on the second circular line at right angles to the surface of the sphere and (h) covering the remainder of the sphere as in steps (a) and (b).

BRIEF DESCRIPTION OF THE DRAWINGS

In FIG. 1 is shown a front elevation of a preformed cellular glass block prepared in accordance with the invention.

In FIG. 2 is shown an end view of a prepared cellular glass block.

In FIG. 3 is an end view of a prepared cellular glass block coated with adhesive.

In FIG. 4 is a fragmentary cross-section through the curvature of the spherical metallic vessel, showing several cellular glass blocks adhered thereto.

In FIG. 5 is a bottom plan view of the initial row of cellular glass blocks, after application to the outside of the spherical metallic vessel.

FIG. 6 is a bottom plan view of the outside of the spherical vessel.

FIG. 7 is a front elevation of the outside of the partially insulated metallic spherical vessel.

DETAILED DESCRIPTION

Metallic storage vessels insulated in accordance with this invention are commonly made of steel. Stainless steel or aluminum can also be used. The vessels are generally upwards of 40 feet in diameter, commonly of 90–100 feet in diameter.

The vessels are generally of welded construction and have various fittings, including nozzles, manholes, platform supports, handrail posts and legs. These fittings are usually insulated with the same type and thickness of insulation as the body of the spherical vessel.

The metallic surface should be clean and dry prior to application of the insulation. In some cases, the surfaces can be cleaned by wire brushing to remove dirt and loose foreign matter. The application of the insulation material to surfaces which are damp or frosted will generally be unsatisfactory.

Preferably, the surface of the sphere is cleaned by sand blasting to gray metal to remove mill scale, old insulation, adhesive, etc.

A primer can be, and preferably is, applied to the clean metal surface. Primers which are compatible with a metallic substrate and with the glass insulation blocks include various asphalt compositions and inorganic zinc primers. Typical of commercially available asphalt primers are Primer Sealer 3A (Pittsburg Corning) and Lion Nokorode SP Asphalt (Lion Oil Co.). Exemplary of commercially available inorganic zinc primers are Carboline carbozinc (CZ-11) or duPont industrial primer. Preferably a zinc primer is used, at a thickness of 2–5 mils. For the most successful adhesion of insulation to metal, an area on the vessel is primed on the same day on which it is cleaned.

"Insulation", "insulating material" and "preformed cellular glass insulation blocks", in the specification and claims, mean preformed blocks or slabs of lightweight rigid insulation composed of millions of completely sealed glass cells. The material selected should be impermeable to water, dimensionally stable, acid resistant, have high compressive strength, be noncombustible and easy to cut and shape. The materials used in the practice of this invention are those which comply with ASTM C552-73 for block and pipe insulation or U.S. Federal Specifications HH-1-1751/3A for pipe covering or HH-1-551E for block insulation.

Exemplary of insulating material which can be used is FOAMGLAS®, a product of Pittsburg Corning Corp., properties of which are:

Physical Properties:

Absorption of moisture
(% by volume) - Non-absorptive. Only moisture retained is that adhering to surface cells after immersion.

Acid resistance - Impervious to common acids and their fumes except hydrofluoric acid.

Capillarity - None

Combustibility - Noncombustible, will not burn.

Composition - Pure glass, totally inorganic, contains no binder.

Compressive strength,
adverage - 7.0 kg/cm$^2$ (ASTM Test) - C 165 - Surfaces capped with hot asphalt per C240-72. Other cappings will give different values.

Density, average - 135 kg/cm$^3$ (ASTM Test) - C 303

Dimensional stability - Excellent

Flexural strength, block average - 5.6 kg/cm$^2$ (ASTM Test) - C 203, C 240

Hygroscopicity - No increase in weight at 90% relative humidity.

Linear coefficient of thermal expansion - $8.3 \times 10^{-6}$/C

Maximum service temperature - +482° C.

Modulus of elasticity, approx. - 10,700 kg/cm$^2$ (ASTM Test) - C 623

Shear strength - 3.5 kg/cm$^2$

Specific heat - 0.18 Kcal/kg . C

Strain point (glass) - 505° C.

Thermal conductivity - 10° C.:0.045 kcal/mh.C (ASTM Test) - C 177, C 518 24° C.:0.047 kcal/mh.C Thermal diffusivity - 0.0052 cm$^2$/sec Water-vapor permeability - 0.00 perm-cm (ASTM Test) - C 355

The thickness of the insulation is determined by the temperature at which the storage vessel will be maintained. For ambient conditions of 80° F., 80% relative humidity, 0.9 emissivity (steel) and 0 m.p.h. wind, the following thicknesses of FOAMGLAS® are recommended:

| Operating Temperatures | Thickness Inches |
|---|---|
| −50 | 6 |
| −40 | 5 ½ |
| −35 | 5 |
| −20 | 4 ½ |
| −15 | 4 |

-continued

| Operating Temperatures | Thickness Inches |
|---|---|
| 0 | 3 ½ |
| 20 | 3 |
| 30 | 3 |
| 40 | 2 |
| 50 to 120 | 1½ |

When the thickness of the insulation is to exceed 2½ inches, two layers should be applied.

During application of the insulation, the vessel being insulated is maintained at a temperature of 80°-100° F. Preferably, this is accomplished by filling the vessel about half full of water and maintaining the water at 80°-100° F., preferably 85°-95° F. The spherical vessel is thus heated by conduction from the warm water. The water is conveniently heated by steam, which is run into the vessel through inflow and outflow means for the material intended for ultimate storage in the vessel.

Although covering of the vessel can be done at high temperatures, it is recommended that the procedure be carried out at ambient temperatures below 100° F. to prevent uneconomical losses of materials.

The insulation material is prepared for application to the spherical metallic vessel by beveling the side walls of the insulation block at a small angle, such that adjacent blocks will fit snugly against each other. This operation is preferably carried out at the site of application, using a saw.

The surface of the glass block which is to be placed against the surface of the metallic sphere is dished or cut to provide an exact fit to the surface of the sphere. This operation is done at the site, preferably using a jig constructed of fire brick.

A front elevation of an insulation block thus prepared is shown in FIG. 1, wherein 11 represents the surface of the block which will be away from the surface of the vessel, 12 represents the end of the block and 13 represents the dished surface prior to application of adhesive. In FIG. 2 is shown an end view of a prepared block, wherein 11 and 13 are as in FIG. 1 and 14 represents the beveled side wall of the block. It will be understood that the blocks are beveled so that the outer wall 11 of the block is longer than the inner wall, which provides the dished surface 13.

Preparation of the insulation blocks in this fashion is critical because the excellent adhesion of the blocks to the spherical vessel thus eliminates the need for supplemental banding to hold the blocks in place.

Adhesive is applied to the thus-dished surface of the first block using any convenient tool, e.g., a ⅛ inch serrated trowel, to completely fill the dished portion of the block. The surface of the adhesive is sprayed with curing agent and the block is pressed firmly into position, making certain that excess adhesive oozes or exudes from all four edges of the block. Excess adhesive is removed with, e.g., a pointed trowel. This technique assures a perfect bond between the surface of the spherical vessel and the inner surface of the insulation block and also provides a moisture barrier between the vessel and the outside elements. Therefore, care should be taken to be sure there are no voids or holidays between the insulation and the surface. In FIG. 3 is shown an end view of an exemplary block to the dished surface of which adhesive 15 has been applied.

Blocks other than the first block applied are fitted into place one at a time. The edges are butted together and a saw blade is passed through adjacent bricks to assure a tight fit. Adhesive is applied to the dished portion of the second and subsequent blocks as well as to the fitted edges thereof and the thus-applied bricks are adhered to the surface of the spherical vessel 16 as shown in FIG. 4. After several blocks have been applied, the outer surface is smoothed, e.g., with cellular glass scraps, to obtain a uniformly contoured surface.

It has been found that application of adhesive to the blocks, rather than to the surface of the spherical metallic vessel, is required for proper sealing of the block to the vessel.

The adhesive applied to the blocks in the practice of this invention is an uncatalyzed urethane-modified asphalt. Typical of commercially available materials include those identified as PC 88 adhesive (Pittsburgh Corning Corp.) and Lion Nokorode® 707.

The Pittsburgh Corning product has an asphalt component (95% solids), which is mixed with an isocyanate-containing component (100% solids) in a ratio of 40-50:1, preferably 44:1. The asphalt component is mixed with the isocyanate component just before use. The asphalt component is stirred before the isocyanate component is added and the mixture is stirred for about 2 minutes.

The Nokorode 707 consists of a base of elastomeric film-forming polymers, including an asphalt plasticizer. The second component contains the isocyanate curing agent. The components are mixed as for the PC 88 adhesive. The pot life of the mixture varies from 45 minutes to 24 hours, depending on the temperature.

The adhesive components, prior to and after mixture together, are therefore kept at temperatures of 35°-50° F. The mixed materials are protected from rain and heavy moisture during application.

The surface of the adhesive, just prior to application to the spherical vessel, is sprayed with a curing agent or catalyst. Typical of catalysts which can be used are organometallic compounds, i.e. alkanoic acid esters of multivalent metals and compounds of the formula $R_nM(OCOR^1)_o$ wherein n + o are equal to the valence of the metal, R is alkyl of up to 8 carbon atoms and $R^1$ is alkyl of up to 17 carbon atoms. Compounds of tin are preferred, particularly dialkyltin dialkanoates of the formula $R_2S_n(OCOR^1)_2$, most particularly when R is alkyl of up to 6 carbon atoms and $R^1$ of up to 13 carbon atoms. Dibutyl tin dilaurate is particularly preferred. The organo-metallic catalyst is conveniently applied from a solvent, e.g., petroleum naphtha boiling at 300°-360° F. Generally 5-15% of dialkyl tin dialkanoate in solvent is applied.

Application of the insulation blocks on the surface of the vessel is begun at either the highest or lowest point on the vessel, which are represented by 53 and 51, respectively, in FIG. 7. The first block is laid, for example, at the lowest point 51 with the long axis or edge of the block parallel to the ground. As shown in FIG. 5, a bottom plan view of the starter row of insulation blocks, blocks after the first block are lined up on either side of the first block to a predetermined distance, represented by the line 52, from the starting point 51. The distance is 20-30% of the radius of the sphere, preferably 25-30% of the radius. For example, for a sphere 60 feet in diameter, the starter row will have a radius of 8 feet.

As shown in FIG. 6, another plan view of the bottom outside of the vessel, subsequent courses of blocks are laid parallel to the starter course and on either side of the starter course, until an area of the sphere is covered corresponding to that circumscribed by a circle having a radius of the preselected distance (52). This circle corresponds to the line on which the blocks are cut with a saw, at right angles to the surface of the spherical vessel. The blocks thus cut are in a plane parallel to the surface of the ground. Above this point, glass blocks are laid in courses, the long axis of each block being parallel to the plane of the circle 52, until the insulation is built up to a distance from the top of the sphere corresponding to the distance between 51 and 52. This is represented by the section between 53 and 52' in FIG. 7. Blocks are applied on this section of the sphere as on the initial section of the bottom of the spherical vessel.

The insulated surface of the vessel is smoothed out and can be covered with weather-proofing, e.g., glass fiber cloth, which is usually secured to the surface of the cellular glass bricks with mastic.

DESCRIPTION OF A PREFERRED EMBODIMENT

In a most preferred embodiment, the process of the invention is one in which the spherical vessel is filled with about half its volume of water, maintained at 85°-95° F.; the exterior surface of the vessel is primed with an inorganic zinc primer; and the curing agent for the urethane-modified asphalt adhesive is dibutyltin dilaurate.

Without further elaboration, it is believed that one skilled in the art can, using the preceding description, utilize the present invention to its fullest extent. The following preferred specific embodiment is, therefore, to be construed as merely illustrative and not limitative of the remainder of the disclosure in any way whatsoever. In the following example, the temperatures are set forth uncorrected in degrees Fahrenheit; unless otherwise indicated, all parts and percentages are by weight.

EXAMPLE I

A steel spherical vessel 60 feet in diameter is cleaned of scale, rust, oil and other foreign matter by sand blasting to a grey metal surface and primed with an inorganic zinc primer (Carboline carbozinc). The sphere is filled with water to its equator and the water is heated so as to keep the exterior surface of the sphere at 90° F.

A block of cellular glass insulation (Pittsburgh Corning FOAMGLAS ®) 9"×12"×2½" is beveled on the long walls thereof. The block is dished using a fire brick jig to exactly fit the external curvature of the sphere.

Urethanated asphalt adhesive (Lion Nokorode 707) is prepared by mixing 44 parts of asphalt component, which is stirred for 90 seconds initially, with 1 part of urethane component (di- and polyisocyanates). The combined mixture is stirred together for three minutes. The resulting material is kept at 40° F. during its useful life.

Adhesive is applied to the dished surface of the prepared block with a serrated trowel so that there is a continuous coating of adhesive on the surface. The coating of adhesive is sprayed with a 12% solution of dibutyltin dilaurate in petroleum naphtha and the block is immediately pressed into position at the lowermost (South Pole) point of the surface of the spherical vessel.

The block is pressed firmly, taking care that excess adhesive oozes from all four edges of the block. Excess adhesive is removed with a pointed trowel.

A subsequent block is prepared as above and is fitted into position by butting the edges together and passing a saw blade between the blocks. After an exact fit is obtained, adhseive is applied to the dished surface as for the first block and to the edge of the block. The block is fitted into position and pressed firmly.

The first course of blocks is thus extended to a length of 16 feet, 8 feet on each side of the South Pole. Subsequent courses are laid on either side of the first course.

When the bottom of the spherical vessel has been covered to a radius of 8 feet, a circular line, originating at the South Pole and having a radius of 8 feet, is inscribed on the insulated surface using trammel points. The insulation is cut with a saw at right angles to the surface of the spherical vessel.

Subsequent courses of blocks are laid with the long edges of the blocks parallel to the plane of the ground, until the covered area is within 8 feet of the North Pole of the spherical vessel.

A circular line originating at the North Pole and having a radius of 8 feet is inscribed on the insulated surface with trammel points and the blocks cut at a right angle to the surface of the sphere. The topmost segment of the sphere is covered as was the bottom segment.

The surface of the insulation is smoothed using cellular glass scraps as abrasive.

The insulated sphere is covered with fiberglass cloth, bonded to the cellular insulation by mastic.

Contemplated as equivalent to the placement of blocks on the surface of the spherical vessel as set out is placement of the first cellular block at any selected starting point, e.g., on the equator of the vessel, and building up the remainder of the insulation by covering a first polar section, a center section and a second polar section, the poles being appropriately translated from 51 and 53, shown in FIG. 7.

The preceding example can be repeated with similar success by substituting the generically or specifically described reactants and/or operating conditions of this invention for those used in the preceding example.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for the application of preformed cellular glass insulation blocks to the exterior surface of a spherical metallic storage vessel comprising the steps of:

(a) cleaning the exterior surface of the vessel;

(b) maintaining the vessel at a temperature of 80°-100° F.;

(c)

(1) beveling the side walls of a preformed cellular glass insulation block, (2) dishing the shorter inner surface of the preformed block to correspond to the contour of the spherical vessel to which the block is to be adhered, (3) applying uncatalyzed urethane-modified asphalt adhesive stored at 35°-50° F. just prior to use to the thus dished inner surface and beveled edges of the cellular glass block to completely fill the dished surface, (4) spraying the thus-applied urethane-modified asphalt adhesive with a curing agent, and (5) pressing the block against the surface of the vessel whereby adhesive oozes from between the block and the surface of the vessel, and (d) repeating steps of (c) with successive blocks, each of which is flat-butted firmly against adjacent previously-applied blocks, until the entire surface of the vessel is covered.

2. The method of claim 1, wherein the vessel is filled with about half its volume of water, maintained at 80°-100° F.

3. The method of claim 1, wherein the exterior surface of the vessel is primed with an inorganic zinc primer.

4. The method of claim 1, wherein the curing agent for the urethane-modified asphalt adhesive is a dialkyltin dialkanoate.

5. The method of claim 2, wherein the water is maintained at 85°-95° F.

6. The method of claim 1, wherein the vessel is filled with about half its volume of water, maintained at 85°-95° F.;

the exterior surface of the vessel is primed with an inorganic zinc primer; and the curing agent for the urethane-modified asphalt adhesive is a dialkyltin dialkanoate.

7. The method of claim 6, wherein the dialkyltin dialkanoate is dibutyltin dilaurate.

* * * * *

UNITED STATES PATENT AND TRADEMARK OFFICE

Certificate

Patent No. 4,155,787 Patented May 22, 1979

Eddie Lee De Sadier

Application having been made by Eddie Lee De Sadier, the inventor named in the patent above-identified, and Environmental Control Specialists, Inc., the assignee for issuance of a certificate under the provisions of Title 35, Section 256, of the United States Code, deleting the name of Eddie Lee De Sadier and adding the name of Calvin R. Morgan as the sole inventor, and a showing and proof of facts satisfying the requirements of the said section having been submitted, it is this 6th day of Mar., 1984, certified that the name of the said Eddie Lee De Sadier is hereby deleted from the said patent and the name of the said Calvin R. Morgan is hereby added to the said patent as the sole inventor.

Fred W. Sherling,
*Associate Solicitor.*